United States Patent [19]

Hughes

[11] Patent Number: 4,591,287

[45] Date of Patent: May 27, 1986

[54] MEANS FOR SECURING TUBULAR MEMBERS IN FIXED SPACED RELATION

[75] Inventor: Gerry A. Hughes, Murfreesboro, Tenn.

[73] Assignee: Samsonite Corporation, Denver, Colo.

[21] Appl. No.: 642,491

[22] Filed: Aug. 20, 1984

[51] Int. Cl.$^4$ ............................ F16B 7/08; F16B 9/02
[52] U.S. Cl. .................................. 403/237; 403/246; 403/390
[58] Field of Search ............... 403/389, 390, 245, 246, 403/234, 237, 233, 191, 190, 391, 396

[56] References Cited

U.S. PATENT DOCUMENTS

| | | | |
|---|---|---|---|
| 2,303,309 | 11/1942 | McArthur | 403/191 |
| 2,308,831 | 1/1943 | Roney et al. | 403/191 |
| 2,452,406 | 10/1948 | Volkery et al. | 403/391 |
| 2,661,968 | 12/1953 | Kolbe | 403/389 |
| 4,150,907 | 4/1979 | Thurnauer | 403/191 |
| 4,273,465 | 6/1981 | Schoen | 403/389 |
| 4,507,105 | 3/1985 | Stottmann et al. | 403/91 |

Primary Examiner—Cornelius J. Husar
Assistant Examiner—Peter M. Cuomo
Attorney, Agent, or Firm—George J. Netter

[57] ABSTRACT

Tubular members to be interconnected in a rigid configuration each include a radially extending stud affixed to the tube outer surface (e.g., welded) and terminating in an enlarged head. First and second connector parts each have a relatively flat side which abut against one another in assembly to form an elongated connector, the cross-section of which is circular and of a diameter substantially identical to that of the tubular members. The flat surface of each of the connector parts includes cavities for receipt onto the studs. Each connector part cavity encompasses approximately one-half of the studs such that when the connector halves are fitted onto a pair of studs, they will completely enclose the two studs with the end surfaces of the connector parts contacting the tubular members sidewalls immediately adjacent the studs. The connector parts ends are formed into curved areas such that when they are assembled onto the studs they will smoothly and continuously contact the tubular member surfaces.

2 Claims, 5 Drawing Figures

MEANS FOR SECURING TUBULAR MEMBERS IN FIXED SPACED RELATION

The present invention relates generally to tubular member securing means, and more particularly, to means for interconnecting a pair of tubular members in fixed spaced relation.

BACKGROUND

The use of metal tubular members for fabricating a variety of furniture items such as chairs, tables or stands, for example, is a frequently encountered construction technique. To provide stability to such structures requires, in many instances, interconnecting means between the various tubular members that will not only properly position them to accomplish their supporting function, but also provide the necessary stability and rigidity, as well as geometric integrity to the entire structure.

Typically, in the past, tubular members have been connected together by the use of conventional screws, bolts, and the like. These interconnection means have not been found to be fully satisfactory in that the threaded members used would tend to pull loose from the walls of the tubular members or they were poorly anchored with respect to one another resulting in excessive pressures being at the interconnection points due to leverage of weight and loading forces.

SUMMARY OF THE DISCLOSURE

A pair of tubular members to be interconnected in a fixed and rigid configuration in accordance with the techniques of this invention each include a radially extending stud affixed to the outer surface of the tube and terminating in an enlarged head. Specifically, each stud extends at right angles from the outer surface of the tube and they are all the same length with the means for affixing of the studs to the tube being a weldment, for example.

First and second connector parts each have a relatively flat side which abut against one another in assembly to form an elongated connector, the cross-section of which is circular and of a diameter substantially identical to that of the tubular members. The flat surface of each of the connector parts includes cavities formed therein permitting receipt onto the studs and closely fitting about the enlarged heads. More particularly, each of the connector part cavities encompasses approximately one-half of the studs mounted to the tubular members such that when the connector halves are fitted onto the studs of apair of tubular members, they will completely enclose the two studs with the end surfaces of the connector parts contacting the tubular members sidewalls immediately adjacent the studs. The end surfaces of the connector parts are formed into curved areas such that when they are assembled onto the studs they will smoothly and continuously contact the tubular member surfaces. A transverse centrally located opening extends completely through both connector parts. A bolt is located within the transverse opening threads into a nut for securing the connector parts together.

DESCRIPTION OF A PREFERRED EMBODIMENT

Figure 1:
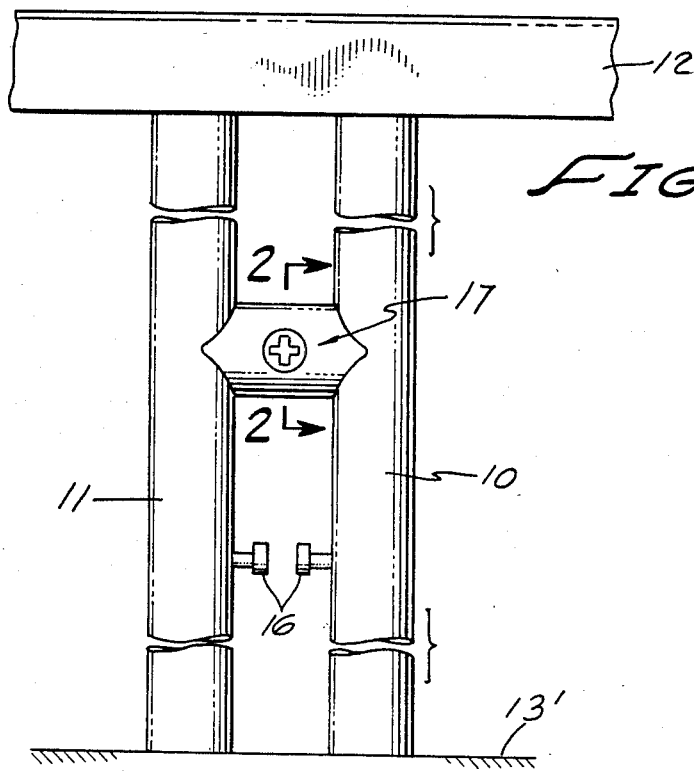
FIG. 1 shows a side elevational view of the tubular member connecting means of this invention shown assembled onto a pair of tubular members.
Figure 2:
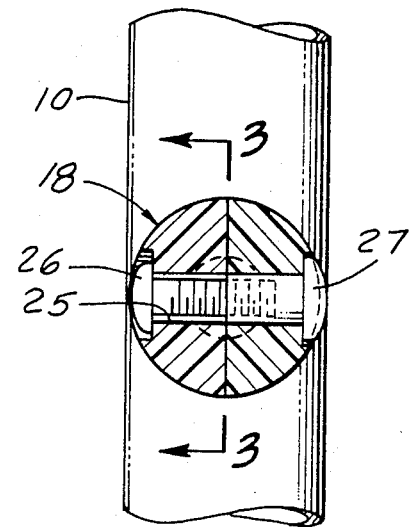
FIG. 2 is a sectional, elevational view taken along the line 2—2 of FIG. 1.

With referance now to the drawing and particularly FIG. 1, there are shown a pair of hollow, metal tubular elements or members 10 and 11 which are shown for illustrative purposes only to have one end of each holding a load surface such as a table top, for example, enumerated as at 12 and the opposite ends resting on a ground or floor plane 13.

Figure 3:
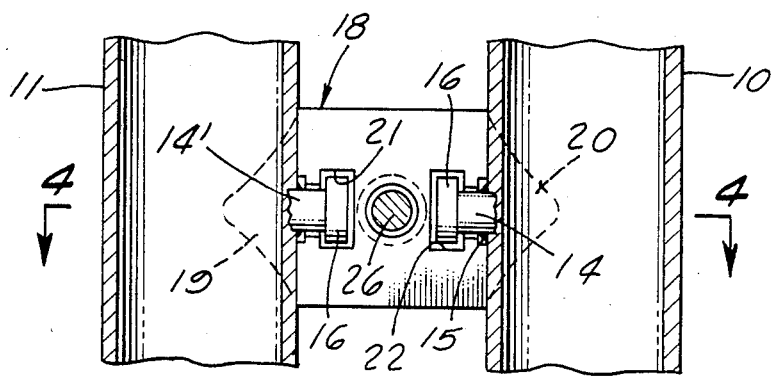
FIG. 3 is a further elevational, sectional view taken along the line 3—3 of FIG. 2.

At one or more selected points along the length of each of the tubular members, where it is decided to effect reinforcement and spaced interconnection, there is provided a stud 14 which is secured to the tube wall by welding, for example, as at 15, the outer end of the stud including an enlarged head 16 (FIG. 3). That is, as best shown in FIG. 3, two studs 14 and 14' are affixed to the tubular members 10 and 11, respectively, so as to be directly across from one another when the tubular members are located in their proper supporting position for the table top 12, for example, and extending at 90 degrees to the tubular members. Also, each of the enlarged heads 16 is spaced at the same distance from the outer surface of the tubular member for a purpose to be described.

Figure 5:
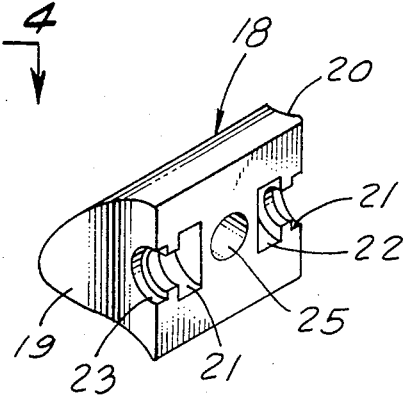
FIG. 5 is a perspective view of one connector part.

The connection and securing means are identified generally as at 17 and, in a way that will be more particularly described, engage the studs 14 and 14' in a fixed and secure manner lockingly maintaining the tubular members 10 and 11 at a predetermined spaced relation. The means 17 include two parts which are symmetrically constructed and, therefore, only one of the parts, shown in FIG. 5 and identified as at 18, will be described in detail.

The connector means 17 consists of a one-piece molded or otherwise formed body which, in cross-section, is semi-circular with each of its end faces being formed into concavely curved surfaces 19 and 20. First and second cavities 21 and 22 are formed along the longitudinal axis of the flat face, and axially located entrance openings 23 and 24 of a diameter enabling receipt of a stud 14, 14' therein are located in the curved end surfaces 19 and 20, respectively.

In assembly two connector parts are received onto a pair of studs 14 and 14' as shown in FIG. 3, with the openings 21 and 22 of each connector part fit over the enlarged heads of the studs forming a unitary connector body that is substantially circular in cross-section. When so assembled, the curved surfaces 19 and 20 contactingly engage the peripheral surface of the tubular members 10 and 11.

A transverse opening 25 located in the center of the connector part long dimension between the two enlarged cavities 21 and 22 receives a threaded bolt 26 through one of the parts and the second connector part opening includes a nut 27 therewithin.

Figure 4:
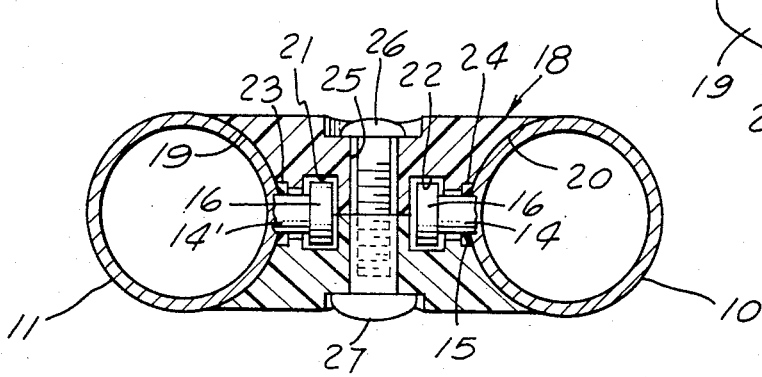
FIG. 4 is a sectional elevational view taken along the line 4—4 of FIG. 3.

As can be seen best in FIG. 4, in final assembled condition on the tubular members, the nut and bolt when threaded together serve to locate the two connector parts on the studs 14 and 14' with the surfaces 19, 20 continuously engaging the members 10 and 11. In this way, the tubular members are secured in a rigid, fixed, spaced relationship.

Although other materials for constructing the connector parts may be found suitable, excellent results have been found to date by making them from a molded polypropylene, and the nut and bolt means of metal. It is also preferable in application to form the curved surfaces 19 and 20 at the ends of the two connector parts along an arc which is slightly less than that of the tubular members 10 and 11 so that when the two parts are assembled (FIG. 4), the curved surfaces 19 and 20 will tightly grip the tubular members as a result of the inherent springlike qualities of the connector part material.

I claim:

1. A device for holding first and second generally circular cross-section tubular members in a spaced apart rigid relationship, comprising:

first and second stud means respectively welded to the first and second tubular members, each said stud means having a uniformly dimensioned shaft portion and an enlarged head at one terminus;

first and second molded synthetic plastic connector parts each having a generally semicircular cross-section and a flat surface with a cavity for receiving a stud therein, said connector parts being assembled onto the studs with the flat surfaces in contact with one another, and other surfaces on the connector parts in flush contacting relation to the outer surface of each tubular member and having a circular curve slightly less than the curve of the tubular members; and threaded bolt and nut means securing the connector parts together.

2. A device as in claim 1, in which the assembled connector parts have a diameter substantially identical to that of a tubular member.

* * * * *